(12) United States Patent  
Velusamy et al.

(10) Patent No.: US 8,478,229 B2
(45) Date of Patent: Jul. 2, 2013

(54) METHOD AND APPARATUS FOR NOTIFYING REGISTERED DEVICES OF AN EMERGENCY CALL

(75) Inventors: Umashankar Velusamy, Tampa, FL (US); Paul Hubner, McKinney, TX (US); Sanjay K. Udani, Arlington, VA (US); Armando P. Stettner, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 12/640,751

(22) Filed: Dec. 17, 2009

(65) Prior Publication Data

US 2011/0151829 A1    Jun. 23, 2011

(51) Int. Cl.
*H04M 11/04* (2006.01)
(52) U.S. Cl.
USPC ............................ 455/404.2; 379/45

(58) Field of Classification Search
USPC .......... 455/404.1–404.2, 456.1–457; 379/45; 340/539.12–539.13
See application file for complete search history.

(56) References Cited

U.S. PATENT DOCUMENTS

| | | | |
|---|---|---|---|
| 2002/0168958 A1* | 11/2002 | Ford et al. | 455/404 |
| 2006/0133582 A1* | 6/2006 | McCulloch | 379/45 |
| 2007/0060208 A1* | 3/2007 | Coste-Martinez et al. | 455/567 |
| 2008/0166992 A1* | 7/2008 | Ricordi et al. | 455/404.2 |
| 2008/0304630 A1* | 12/2008 | Nguyen et al. | 379/45 |
| 2011/0111728 A1* | 5/2011 | Ferguson et al. | 455/404.2 |
| 2011/0117878 A1* | 5/2011 | Barash et al. | 455/404.2 |

* cited by examiner

*Primary Examiner* — Kashif Siddiqui (57) ABSTRACT

An approach is provided for alerting registered devices of an emergency call, detecting an emergency call from a calling device; determining an identifier of the calling device; retrieving a list of one or more registered devices based on the identifier; determining location information of the calling device; and generating a notification message for transmission to the one or more registered devices, wherein the notification message specifies notification of the emergency call and the location information of the calling device.

20 Claims, 8 Drawing Sheets

METHOD AND APPARATUS FOR NOTIFYING REGISTERED DEVICES OF AN EMERGENCY CALL

BACKGROUND INFORMATION

Modern telecommunications services, particularly wireless mobile communication devices, are essential public safety tools. During emergencies, these devices are indispensible for contacting the appropriate people or authorities. Traditionally, a person would call for help when an emergency arises, and waits for arrival of emergency responders. This waiting period may be of a relatively short duration, but, nevertheless, may be crucial. For example, the person under duress may be trapped in a locked room and a fire is rapidly spreading to the person's location. In such a situation, the person can be easily rescued if another person who has access to the locked room is aware that there is an emergency. Moreover, a number of emergency situations may not warrant the dispatch of emergency responders if someone can assist that person in time. That is, the emergency can be easily diffused or resolved if the appropriate person is able to help. For example, with the prevalence of mobile phones employed by adolescents, these adolescents may deem certain situations to be on an emergency, when in fact such circumstances can be satisfactorily addressed by a family member, or an adult or authority figure.

Current approaches to emergency call handling do not permit much integration with other communication systems, as to permit targeted notification of emergency calls.

Therefore, there is a need for an approach that effectively and efficiently disseminates an emergency notification to individuals other than emergency responders.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and apparatus for notifying registered devices of an emergency call are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a mobile device, it is contemplated that these embodiments have applicability to any device capable of communicating over a network using voice and non-voice technologies.

Figure 1:
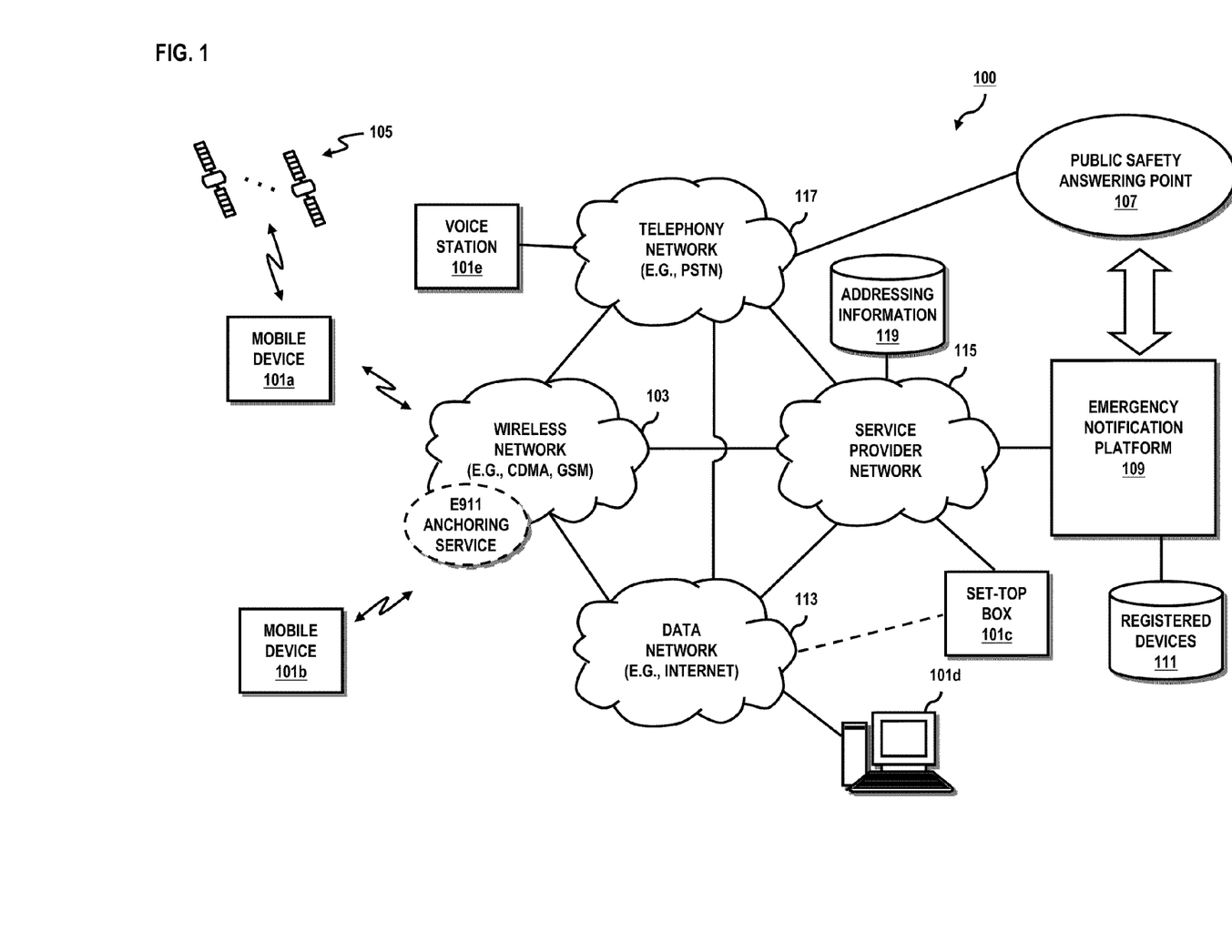
FIG. 1 is a diagram of a system capable of notifying registered user devices of an emergency call, according to an exemplary embodiment.

FIG. 1 is a diagram of a system capable of notifying registered user devices of an emergency call, according to an exemplary embodiment. Emergency calls, or "911" calls, are one example of a type of call that relies on the identification and location of the calling party to be determined in order to provide a service. Currently, when a person is in an emergency situation, the person's instincts would resort to dialing 911. If the public safety answering point (PSAP) receiving the emergency call is equipped, the operator answering the call will be able immediately recognize the caller's address and dispatch the emergency responders to the address. If the caller's location cannot be immediately determined, the person answering the call will have to verify the address and then dispatch emergency responders. Thereafter, the emergency responders, after an uncertain delay period, arrive at the site of the person in distress to offer assistance. Depending on the nature of the emergency, this delay (which may only be a few minutes) can be critical, and may be a matter of life or death.

To address this delay problem, the approach of system 100, according to certain embodiments, can alert certain people within the vicinity of the caller. In this manner, because of their proximity to the caller, these individuals may be able to assist the caller prior to the emergency responders. For example, such people may include a neighbor, a family member, a friend, or even a stranger (who might have walked past the caller a short moment ago), may be able to help even before the emergency responders arrive. The approach, according to certain embodiments, disseminates an alert about the caller to users within a predetermined proximity so they can attempt to help the caller. In addition, a notification can also be sent to the caller's designated list of emergency contacts, who, when notified, may be able to provide emergency responders with additional information (such as medication taken by the caller or the emotional situation the caller may be in) that might help. In certain embodiments, the emergency contact is the same person as the individual within the required proximity to the caller.

While various embodiments are described herein in relation to emergency calls, the principles may also be applicable to any type of voice call that utilizes location and identification information about the calling party when providing a service. In system 100, user devices, such as mobile devices 101a, 101b (e.g., cellular phones, BLUETOOTH-enabled devices, WiFi-enable devices, etc.), a set-top box (STB) 101c, a computer 101d (e.g., desktop computer, laptop, web appliance, etc.), and voice station 101e. Mobile devices 101a, 101b are configured to communicate over a wireless network 103 using voice sessions as well as other non-voice sessions, e.g., short messaging service (SMS), enhanced messaging service (EMS), multimedia messaging service (MMS), instant messaging (IM), etc. Mobile devices 101a, 101b may be any cellular phone, radiophone, satellite phone, smart phone, wireless phone, or any other suitable mobile device, such as a personal digital assistant (PDA), pocket personal computer, tablet, customized hardware, etc.

Enhanced 911 (E911) service is a feature of the emergency call system that automatically associates a physical address with a calling party's Automatic Number Identification (ANI). In other words, the E911 service provides emergency responders with the location of the emergency without the calling party having to provide such information. The final location of the 911 operator handling the call is known as a Public Safety Answering Point (PSAP). Traditionally, PSAPs handle emergency voice calls without any capability to utilize other communication means. In general, the ANI information for a 911 caller is used to look up the address of the calling party in an Automatic Location Identification (ALI) database (not shown). For mobile devices, identifying the nearest PSAP for the caller can be enhanced by including geographical or spatial information (for determining local information) in the telephone call set-up as well. As shown in the example of FIG. 1, a constellation of global positioning system (GPS) satellites 105 can communicate with the mobile devices 101a, 101b to provide such location information.

By way of example, one or more mobile devices 101a, 101b may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. SPS technology utilizes a constellation of satellites that transmit signals to receivers (not shown) of, for example, one or more mobile devices 101a, 101b, so that the receivers may determine corresponding spatial positions (or locations), speeds, directions, and/or timing for mobile devices 101a, 101b.

Public Safety Answering Point (PSAP) 107 operates in conjunction with an emergency notification platform 109 to provide a notification capability. The platform 109 can determine which devices are within a predetermined proximity to a calling device, and issue an alert to these devices. A database 111 is maintained store information about which devices are participating in the emergency notification service. These registered devices can correspond to users that may or may not be familiar with the calling party. In one embodiment, users who may be willing to participate in this service are trained medical personnel, police officers, fire fighters, volunteers, etc. With this emergency notification service, an off-duty officer, for example, may be able to reach the person in distress much more rapidly than emergency responders because the officer is nearby. The processes associated with this emergency notification service are more fully detailed below with respect to FIGS. 3-6.

In system 100, according to certain embodiments, one or more networks, such as data network 113, service provider network 115, telephony network 117, and/or wireless network 103, are provided to handle various communication sessions, voice communications as well as non-voice communications. Networks 103 and 113-117 may be any suitable wireline and/or wireless network. For example, telephony network 117 may include a circuit-switched network, such as the public switched telephone network (PSTN), an integrated services digital network (ISDN), a private branch exchange (PBX), or other like network. As shown, an addressing information database 119, according to certain embodiments, stores street addresses of users of the various communication services. Thus, if a caller of voice station 101e initiates an emergency call, for instance, the service provider 115 can obtain the exact address information for forwarding to the PSAP 107. This advantageously avoids the operator having to spend time verifying the address with the caller, which may not even be possible if the caller cannot speak English or, as with a child, know his/her own address. In one embodiment, the emergency notification platform 109 retrieves the street address from the addressing information database 119 via the service provider network 115; under this scenario, it is assumed the service provider operates the telephony network 117. However, the service provider can operate anyone of the other networks 103 and 113 (as well as others not shown) in which case the addressing information database 119 would store addressing information about subscribers of those networks. For example, the service provider network 115 can include a content delivery network to deliver content to set-top box 101c.

Wireless network 103 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Additionally, the networks 113 and 115 may encompass terrestrial broadcasting networks, provider specific networks (e.g., a Verizon® FiOS® network, a TiVo® network, etc), and the like. Further, the service provider can be an internet protocol television (IPTV) service provider, which offer subscribers various video services ranging from multi-channel video programming that mimics traditional broadcast television, to true video-on-demand (VOD) programming. In one embodiment, service provider network 115 integrates the television medium with that of the telecommunications, computing, and media environments, thereby broadening the scope of devices and sources available to individuals for obtaining media content. In this manner, users, via user equipment (e.g., STB 101c) can receive media content accessible over the data network 113. Although the user equipment is described with respect to an STB, it is contemplated that various embodiments have applicability to any device capable of processing audio and/or video streams. Media content broadly includes any audio-visual content (e.g., broadcast television programs, VOD programs, pay-per-view programs, IPTV feeds, digital video disc (DVD) related content, etc.), pre-recorded media content, data communication services content (e.g., commercials, advertisements, videos, movies, songs, images, sounds, etc.), Internet services content (streamed audio, video, or pictographic media), and/or any other equivalent media form.

Although depicted as separate entities, networks 103 and 113-117 may be completely or partially contained within one another, or may embody one or more of the aforementioned infrastructures. For instance, service provider network 115 may embody circuit-switched and/or packet-switched networks that include facilities to provide for transport of circuit-switched and/or packet-based communications. It is further contemplated that networks 103 and 113-117 may include components and facilities to provide for signaling and/or bearer communications between the various components or facilities of system 100. In this manner, networks 103 and 113-117 may embody or include portions of a signaling system 7 (SS7) network, or other suitable infrastructure to support control and signaling functions. As such, the conjunction of networks 103 and 113-117 may be adapted to facilitate the remote control and tracking services of system 100.

Under the scenario of FIG. 1, emergency notification platform 109 is maintained by a service provider, and thus, can interact with the PSAP 107 via the service provider network 115. The emergency notification platform 109 may assist with establishing a communication session between a registered device and the PSAP 107 to enable the gathering of information about the person in the emergency situation. The PSAP 107, thus, may more effectively attend to the emergency call. While specific reference will be made hereto, it is contemplated that system 100 may embody many forms and include multiple and/or alternative components and facilities. In one embodiment, the platform 109 can be deployed as part of the PSAP 107.

Although the approach for providing emergency notification services is described with respect to an emergency call originating from a mobile device, it is contemplated that this approach is applicable to any device capable of supporting a voice call and a non-voice form of communication—e.g., set-top box 101c, and computing device 101d. Computing device 101d may be any suitable computing device capable of receiving the notification message from the platform 109; moreover, the computing device 101d can be a voice over internet protocol (VoIP) phone, skinny client control protocol (SCCP) phone, session initiation protocol (SIP) phone, IP phone, personal computer, softphone, workstation, terminal, server, etc.

As mentioned, one type of voice call in particular that a mobile device (e.g., mobile device 101a) may initiate involves an emergency call to a 911 operator within PSAP 107. For this purpose, the wireless network 103 may provide services and features that allow it to identify and locate the caller. In particular, the wireless network 103 includes an anchoring service that can identify the location of the caller and, based on that information, locate a local 911 operator to handle the call. Consequently, the anchoring service can route the call to the local 911 operator and provide the operator both the identity of the caller and the location of the caller. Any of the various anchoring services for wired, wireless, and voice over IP (VoIP) networks are contemplated.

Based on the determination of the local 911 operator, the wireless network 103 can communicate through telephony network 117 to the local Public Safety Answering Point 107. At the PSAP 107, operators have access to platform 109 that allows each operator to handle voice calls and non-voice messaging applications.

According to one embodiment, the platform 109 allows the 911 operator at the PSAP 107 to communicate with a caller utilizing either a voice call, a non-voice messaging method, or both. A 911 caller, e.g., using device 101a, may for example, be within an immediate vicinity of other devices 101b-101e. The platform 109 can alert these devices 101b-101e, if the platform 109 determines that such devices 101b-101e are located within a predetermined vicinity of mobile device 101a. In this manner, the user of voice station 101e can rush to the calling party. In addition to supporting the traditional scenario in which the caller manually dials 911, the platform 109 can be configured to provide an augmented automatic emergency recognition function, which triggers an alarm to an emergency management personnel—e.g., an elderly person has fallen down and a detection device signals the emergency condition).

Figure 2A:
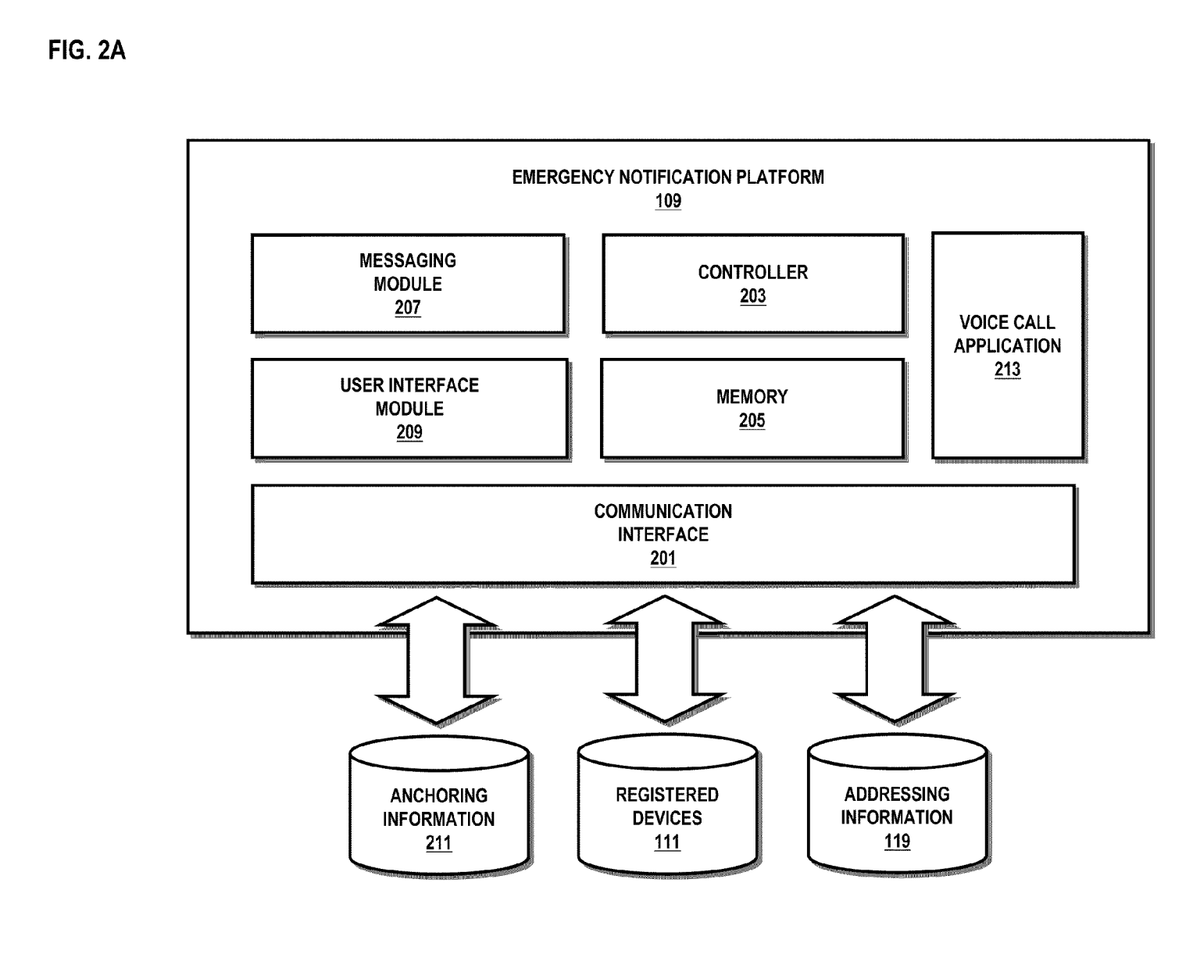
FIGS. 2A and 2B are, respectively, a diagram of an emergency notification platform and a diagram of a user device capable of receiving an emergency notification, according to various embodiments.
Figure 2B:
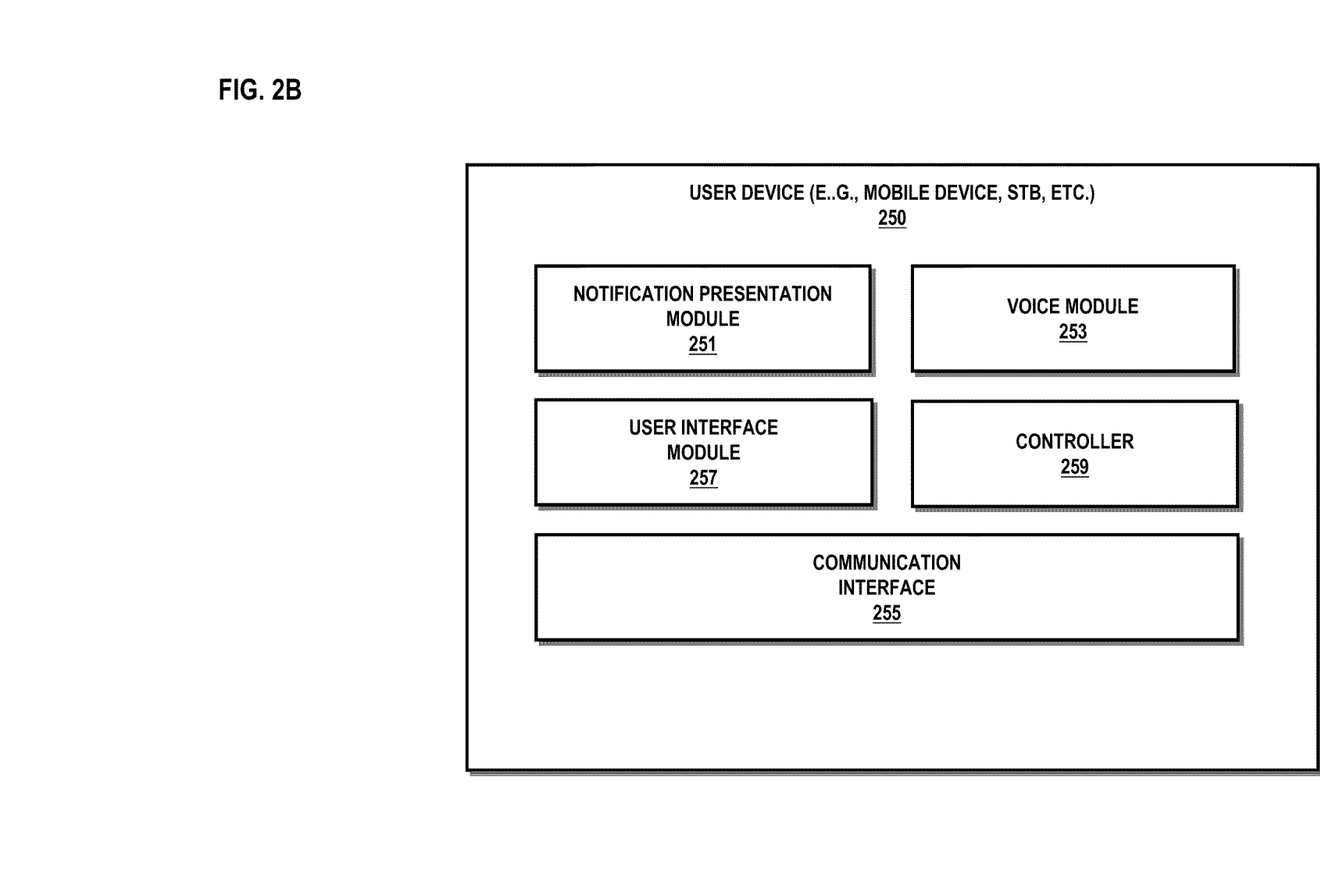

FIGS. 2A and 2B are, respectively, a diagram of an emergency notification platform and a diagram of a user device capable of receiving an emergency notification, according to various embodiments. As seen in FIG. 2A, emergency notification platform 109 may comprise computing hardware (such as described with respect to FIG. 7), as well as include one or more components configured to execute the processes described herein for providing the emergency services of system 100.

By way of example, when a person dials, using mobile device 101a, an emergency number to the wireless network 103, the call is processed by a switch (not shown) either at within the wireless network 103 or the telephony network 117. The switch can communicate with the emergency notification platform 109 to recognize the caller, and to look up the possible recipients, who may be in the vicinity of the caller, of an emergency notification message. In this way, the alert can sent to one or more registered devices of the recipient, as well as multiple recipients.

In one embodiment, the mobile device 101a, after communicating with the platform 109, can directly broadcast a help request to the neighboring devices in the vicinity. In certain embodiments, an alert can be forwarded to a user device via BLUETOOTH or WIFI. These user devices can include computers (e.g., computer 101d) that are nearby. The recipient device can be mobile device 101b, which is configured to accept emergency broadcast messages.

The registered devices capable of receiving the alerts can be, for example, a television or set-top-box 101c. For example, when a person dials 911, an alert can be displayed by the televisions of the neighbors indicating that help is needed. In addition, the same alert can be displayed in the televisions of the caller's family member who may be in a different location (e.g., out of state). Notifications, such as SMS text messages, automated calls to friends and families will be made possible as well. Registered devices will also be able to notify the PSAPs in the event that the original device used by the caller to place the call looses connection as soon as the call was established.

In one implementation, platform 109 includes communication interface 201, controller (or processor) 203, memory 205, messaging module 207, and user interface module 209. Platform 109 may also communicate with one or more repositories, such as an anchoring information database 211, as well as registered devices database 111 and addressing information database 119. In one embodiment, the platform 109 may communicate directly with one or more switches (not shown) within the telephony 117, or may be integrated with the telephony signaling network as an intelligent peripheral or processor, for instance. While specific reference will be made to this particular implementation, it is also contemplated that platform 109 may embody many forms and include multiple and/or alternative components. For example, it is contemplated that the components of platform 109 may be combined, located in separate structures, or separate locations.

According to one embodiment, platform 109 embodies one or more application servers over one or more networks 103 and 113-117. Platform 109 may provide a user interface, e.g., web portal or other networked application, to permit user to access the features and functionality of platform 109 via devices 101a-101e. According to certain embodiments, user interface module 209 may be configured via a web browser or other network-based application or system, such as a voice browser or interactive voice recognition system. This capability permits users, for instance, to directly register their devices to receive notifications.

Messaging module 207 provide messaging services in support of emergency communications initiated by the devices 101a-101e. According to exemplary embodiments, messaging module 207 may be configured to generate control signals for transmission to device 101a utilizing any suitable bearer, such one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 101a, thereby requiring less processing and hence, less power. It is contemplated, however, that coded instructions may also be utilized.

Furthermore, if the caller subscribes to a content delivery service (e.g., Fiber-Optic Television (FIOS)), in addition to the call being routed to the PSAP, emergency notification can also be broadcast through the data network 113 (e.g. Internet).

Additionally, platform 109 may include one or more controllers (or processors) 203 for effectuating the aforementioned features and functionality of the emergency services of system 100, as well as one or more memories 205 for permanent and/or temporary storage of one or more of the aforementioned variables, parameters, information, signals, etc. In this manner, the features and functionalities of emergency messaging may be executed by controller(s) 203 and/or memories 205, such as in conjunction with one or more of the various components of platform 109.

In one embodiment, the platform 109 includes a voice call application 213, which allows a user that has been notified by a registered device to establish a voice call with an operator of the PSAP 107. In this manner, the registered user may convey vital information in assisting with the emergency condition experienced by the calling party; such information can include medical data (e.g., allergies, blood type, medical condition, current medication, etc.), emotional or behavioral state, etc. The voice call application 213 also has access to anchoring information database 211, which stores anchoring information received by the platform 109 as the call is routed to the platform 109. The anchoring information may, for example, include the identity and the location of the caller to assist in handling the emergency call.

The platform 109 also includes a text message module 207 that permits the operator to communicate using text messages, and/or other non-voice-based messages. Although the text message module 207 may be configured to communicate with the wireless network 103 to acquire the anchoring information, this information can be retrieved from the anchoring information database 211. The text message module 207 utilizes the anchoring information to aid in communicating with the caller using non-voice-based messages.

Figure 6:
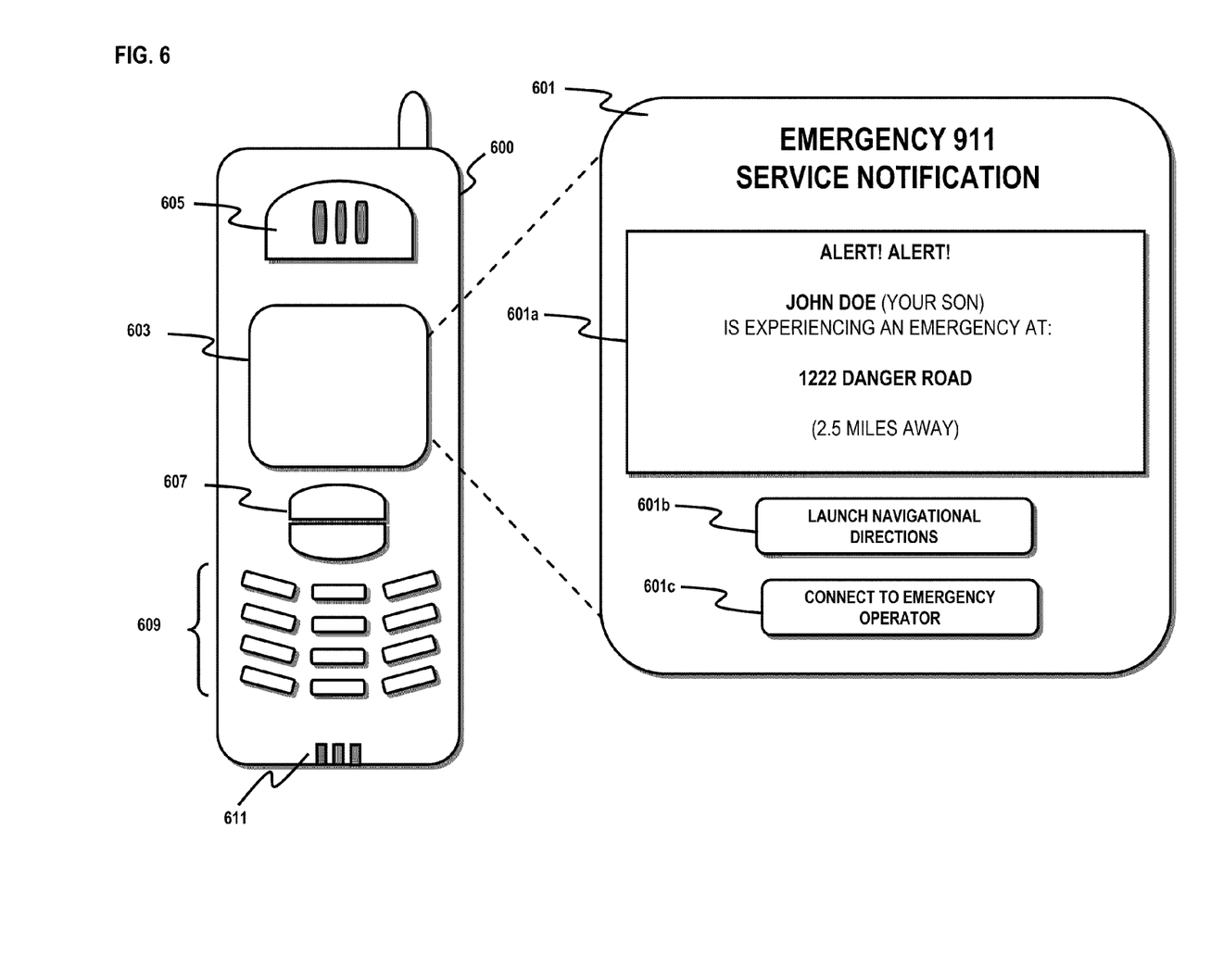
FIG. 6 is a diagram of a graphical user interface (GUI) configured to present an emergency notification, according to an exemplary embodiment.

On the user side, as shown in FIG. 2B, a user device 250, which may be a mobile device (e.g., mobile device 101b of FIG. 1), set-top box 101c, or a computer 101d, includes a notification presentation module 251 that is configured to present a text-based notification message, as well as a voice module 253 configured to establish a voice-based call. Such voice-based call can be traditional plain-old-telephone service (POTS) calls or packetized voice calls (e.g., VoIP). These communication sessions can occur concurrently during an emergency call. It is noted that these communication sessions can be established over a circuit-switched network, a packet-switch network, or a combination thereof. Thus, communication interface 255 can be appropriately configured depending on the transport systems and networks. Although only a single interface 255 is shown, it is noted that multiple communication interfaces may be utilized, depending on the technologies involved. Moreover, the user device 250 employs a user interface module 257 to enable control by the user of the device of these various communication sessions; in one embodiment, the user interface module 257 provides a graphical user interface (GUI) as shown in FIG. 6. Additionally, a controller 259 is configured to coordinate the concurrent communication sessions provided by the notification presentation module 251 and voice module 253; for example, the controller 259 generates the appropriate signaling to control the communication interface 255 for transmissions over the voice channel and the messaging channel.

Figure 3:
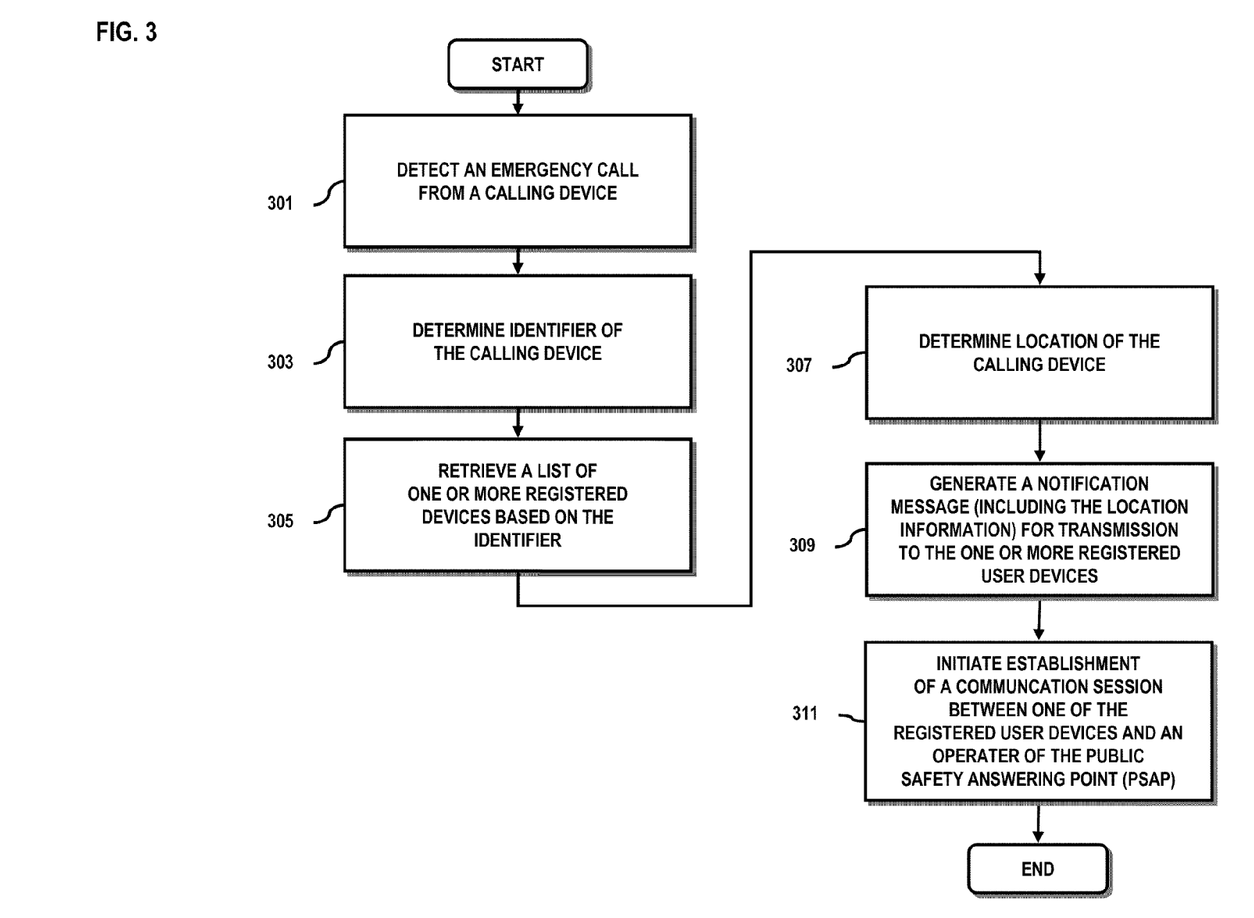
FIG. 3 is a flowchart of a process for notifying registered user devices of an emergency call, according to one embodiment.

FIG. 3 is a flowchart of a process for notifying registered user devices of an emergency call, according to one embodiment. For the purposes of illustration, the process is described with respect to the emergency message platform 109 operating in conjunction with the PSAP 107 (but as a separate entity). However, it is contemplated that the emergency notification platform 109 can reside within the PSAP 107, or otherwise integrated.

Initially, in step 301, a caller, using mobile devices 101a, places an emergency voice call (e.g., 911 call) over the wireless network 103. In step 303, the process determines an identifier of the call. The wireless network 103 routes the emergency voice call to the PSAP 107 that is, for example, nearest the caller (denoted as the "local PSAP"). As part of this routing, the wireless network 103 identifies the caller and location, determines the local PSAP (which in this example is PSAP 107), and then routes the call along with anchoring information to the PSAP 107.

As discussed above, there are certain emergency situations where a user may be attended to more rapidly by those individuals nearby. Consequently, upon obtaining the location of the mobile device 101a (steps 305 and 307), the platform 109 can retrieve a list of registered devices within a certain proximity of the mobile device 101a and compute the distances to these registered devices.

In step 309, a notification message, which may include location information relating to the location of the mobile device 101a, is generated. The location information may be derived from GPS data and/or addressing information (e.g., street address) stored in database 119. The notification message is then transmitted to the one or more registered user devices, e.g., mobile device 101b. The notification message, by way of example, can be presented on a graphical user interface (GUI) of the device 101b, as depicted in FIG. 6.

In step 311, the emergency notification platform 109 may provide an option to the contacted user device to establish communication with the PSAP 107, thereby permitting the user to provide an operator of the PSAP 107 with information about the distressed caller.

In response to receiving the emergency call, the PSAP 107 may thus more effectively resolve the emergency, as well as permit the calling party to be attended to more rapidly. For example, if the emergency call is by an adolescent who has been locked out of his/her own, and the parents are unreachable, a neighbor may be notified to assist. The neighbor may have a spare key to the house, or may offer to have the adolescent stay at the neighbor's home until the parents arrive home.

This resolution of the emergency call provides a number of advantages. First, the dispatch of the emergency responder may be recalled if the operator within the PSAP 107 verifies that indeed the emergency condition no longer exists, thereby permitting these resources to be used or reassigned to other (more urgent) emergencies. Second, the adolescent can immediately be helped, without undue exposure to more harmful or unsafe conditions.

Figure 4:
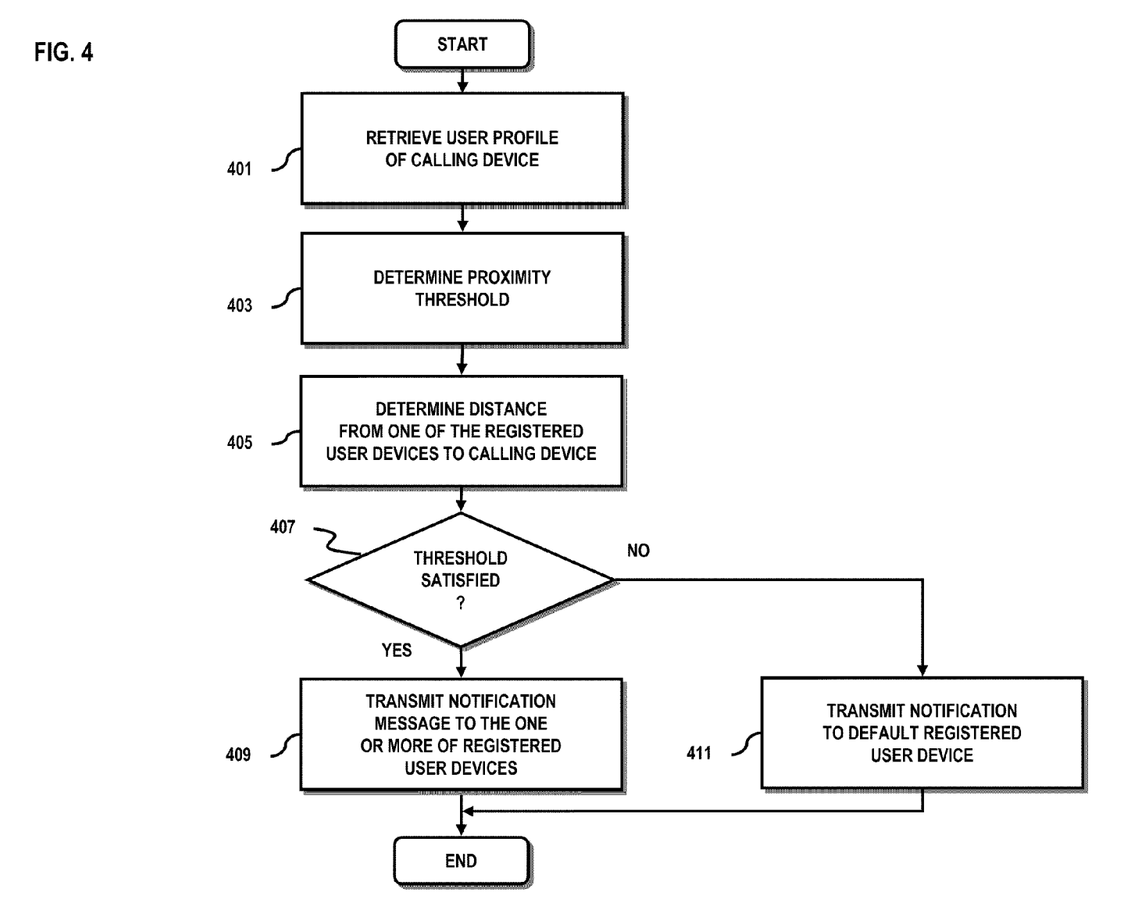
FIG. 4 is a flowchart of a process for determining registered user devices within a predetermined proximity of a calling device associated with an emergency condition, according to one embodiment.

FIG. 4 is a flowchart of a process for determining registered user devices within a predetermined proximity of a calling device associated with an emergency condition, according to one embodiment. To determine which user devices may be notified of the emergency caller's plight, two scenarios are contemplated. The notification can be sent to people who are known to the caller and/or users who may be complete strangers. The willingness to accept assistance from strangers can be specified as part of a user profile setting, according to one embodiment. Thus, a subscriber of the emergency notification service can specify, for example, individuals who are deemed "friends" or "acquaintances"; in this way, if the subscriber makes an emergency call, only these people are alerted (assuming they are within a certain proximity). Under either scenario, the user devices are registered with the platform 109. The platform 109 can obtain the list of user devices based on the subscriber's contact list (e.g., email contacts, social network "friends," etc.).

In step 401, which is optional, an emergency call is received at the PSAP 107, thereby triggering retrieval of a user profile of the caller. Next, a proximity threshold value is determined, as in step 403, from the user profile or specified as a default value by the platform 109. For example, the proximity threshold value can be determined based on an estimated response time, such that the distance will be derived on a value that permits another user to reach the caller prior to the emergency responder. This default value can be based on the location of the caller. For example, if the caller is in a remote area, the proximity threshold value would be greater than in an urban setting. Additionally, if the caller has not specified a list of registered devices, the platform 109 identifies all users within the proximity threshold. The platform 109 may utilize a scheme whereby, a radial distance from the caller is set and iteratively incremented until a predetermined number of people is determined. Because time is of the essence, this value of predetermined number of people can be one or two.

Alternatively, if a list of registered user devices is associated with the caller, then the platform 109 determines the distances from the location of the caller to each of the registered user devices, per step 405. If the threshold is satisfied (as determined in step 407), then the platform 109 sends the notification message to one or more of the registered user devices (step 409). In one embodiment, if no device satisfies the threshold, the platform 109 may designate a default registered user device (i.e., closest one) to receive the notification transmission (step 411).

Figure 5:
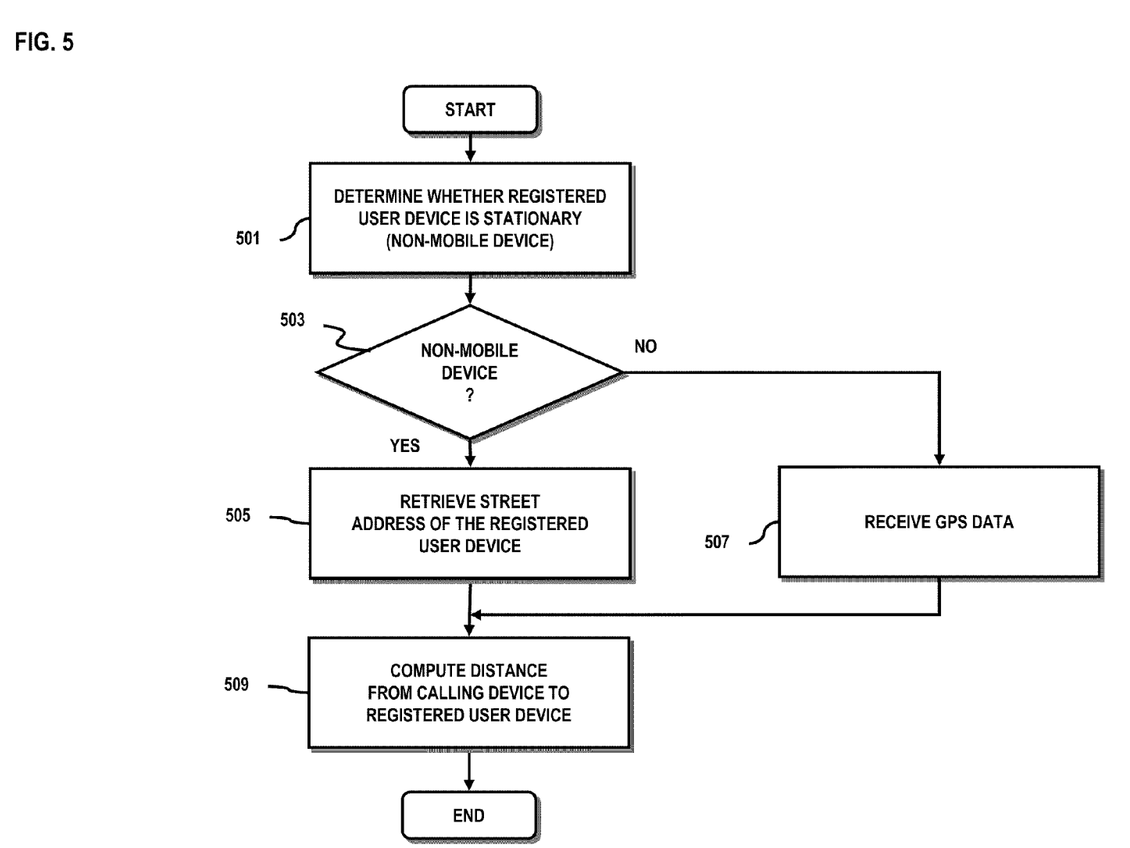
FIG. 5 is a flowchart of a process for acquiring addressing information of stationary user devices, according to an exemplary embodiment.

FIG. 5 is a flowchart of a process for acquiring addressing information of stationary user devices, according to an exemplary embodiment. As mentioned, as part of the notification, addressing information of the caller in distress is provided. In addition, location information about the registered user devices is needed to determine proximity to the calling device. The process of FIG. 5 provides an efficient mechanism to determine the distance from each of the registered user devices to the calling device. According to certain embodiments, the user devices fall into the following categories: (1) stationary devices, and (2) non-stationary (or non-mobile) devices. Examples of stationary devices include customer premise equipment (CPE), set-top boxes, desktop computers, wired telephone stations, etc. Non-stationary devices can include laptop computers, mobile phones, wireless portable devices (e.g., personal digital assistants (PDAs), etc. It is recognized that stationary devices typically are identified with street addresses in which they are located and operated to take advantage of a particular service. For example, set-top box 101c can be associated with location of a premises of a subscriber.

As noted, in one embodiment, the emergency notification service permits a subscriber (e.g., a person who may experience an emergency) to specify the particular users and their corresponding user devices that can receive the alert notifications of the subscriber's emergency status. In addition or in the alternative, the emergency notification platform 109 can consider all communication devices supported by the system 100, thereby ensuring a greater probability that someone will be able to reach the calling party in distress prior to the emergency responders.

In step 501, the platform 109 determines whether anyone of the registered user devices is a stationary (or non-mobile) device. If the device is deemed to be non-mobile (per step 503), then the platform 109 can attempt to retrieve addressing information, e.g., street address, from database 119, per step 505. Otherwise, if the device is mobile, then (assuming it is GPS-enabled), GPS data can be obtained, as in step 507.

Thereafter, the distances from the calling device to each of the registered devices can be computed from the location information, e.g., street address or GPS data.

As earlier explained, the addressing information database 119 can provide a more exact location of a user device, such that if the user device is the one initiating the emergency call, a street location for example can be supplied to the PSAP 107. In some embodiments, the GPS data can be mapped by the platform 109 to a street location.

FIG. 6 is a diagram of a graphical user interface (GUI) configured to present an emergency notification, according to an exemplary embodiment. In this example, a user may employ mobile device 600 to receive an emergency notification corresponding to an emergency call placed by a nearby calling device. For illustrative purposes, mobile device 600 is described with respect to a mobile phone, such as a cellular phone, configured to provide a GUI 601 to users via display 603.

GUI 601 includes a text box 601a that illustrates a message that includes the name of a person who has been identified by the PSAP 107 as experiencing an emergency, and optionally information specifying the relationship between the identified person and the recipient of the notification message. In this example, the person is "John Doe," who is indicated as the son of the recipient of the message. Additionally, location information is provided by the GUI 601; for example, the following street address is shown: "1222 Danger Road." Further, the text box 601a can show the distance of the site of the emergency—e.g., 2.5 miles. Depending on the applications and functional capabilities of the mobile device 600, optional buttons 601b and 601c can be provided. Button 601b permits the user to acquire directions to the site upon activating this "Launch Navigational Directions" button. Hence, upon selection of this button 601b, an appropriate navigation application is invoked in which the present location of the mobile 600 is known and used to automatically determine a route to the calling device. Furthermore, the recipient can be presented with the option, button 601c, to connect to the emergency operator of the PSAP 107. In such an arrangement, the recipient can provide critical information to the operator, for instance, about any special medical condition the emergency caller may have. This information can be relayed to the emergency responders (or, e.g., to a hospital or medical facility) to permit them to more effectively treat the caller.

Under the scenario of FIG. 6, upon receiving this notification, the recipient may be able to more quickly reach the caller, as the caller is only 2.5 miles away. Assuming for example, the son is having an asthma attack, and the recipient (as a parent) suspects such a condition, the parent can bring the asthma medication to treat the son. This approach can be much more effective than the possible treatment by the emergency responders, as they may not have the proper medication or may provide an incorrect preliminary diagnosis.

In this example, mobile phone 600 includes one or more transducers (e.g., speakers) 605 to output audible signals to the user. Cursor buttons 607, keypad 609, and microphone 611 enable users to interact with GUI 601 of display 603. As such, mobile device 600 is, in exemplary embodiments, also capable of speech synthesis and voice recognition. Moreover, the display 603 can be a touch-screen, such that controllers and buttons can be readily activated; for example, the reestablish call box 601e can be a button that activates the reestablishment of the call upon selection.

Although the above GUI 601 is shown and described with respect to a mobile device, it is contemplated the GUI 601 can be provided by anyone of the user devices 101a-101e of FIG. 1, for example.

The described processes, according to certain embodiments, provide a number of advantages. For example, the person in need of emergency care or attention can potentially be assisted more quickly than emergency responders. Under certain circumstances, people who may be equally qualified (or even more qualified) as the emergency responders to attend to the subject. Additionally, the approach permits the recipient of the notification to communicate with the emergency (or 911) operator to provide vital information about the caller or circumstances surrounding the caller.

The processes described herein for providing emergency notifications may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
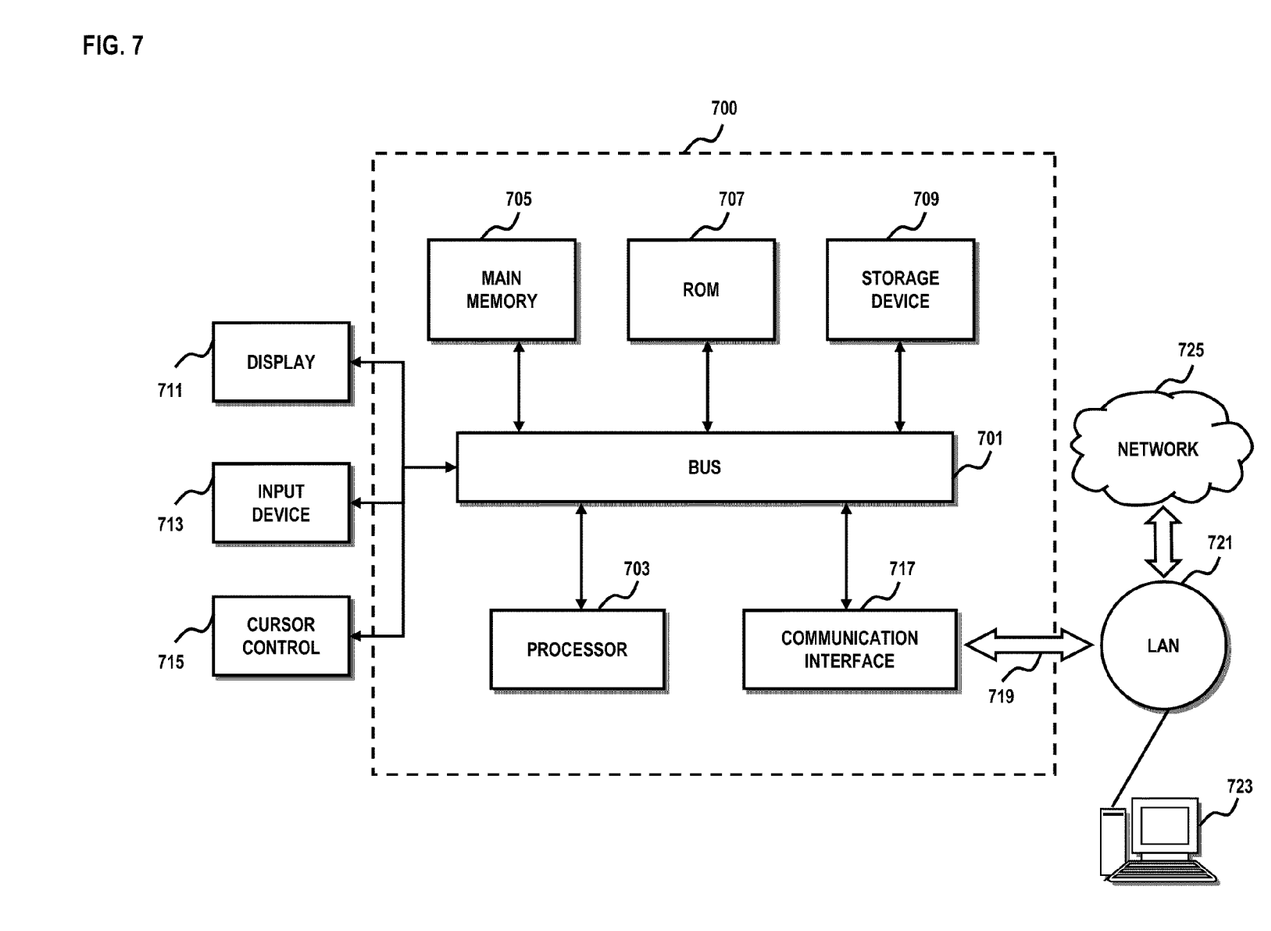
FIG. 7 is a diagram of a computer system that can be used to implement various exemplary embodiments.

FIG. 7 illustrates computing hardware (e.g., computer system) upon which these embodiments can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions (computer program code) to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to certain embodiments, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 6, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting an emergency call from a calling device;
   determining an identifier of the calling device;
   retrieving a list of one or more registered devices based on the identifier;
   determining location information of the calling device;
   selecting a subset of the registered devices according to a proximity threshold determined based on an estimated response time; and
   generating a notification message for transmission to the selected registered devices, wherein the notification message specifies notification of the emergency call and the location information of the calling device.

2. A method of claim 1, further comprising:
   determining whether any one of the registered devices are stationary devices; and
   retrieving a street address corresponding to the determined stationary devices for determining proximity to the calling device.

3. A method of claim 1, wherein the registered devices include either a cellular phone, a computer, a set-top box, or a combination thereof.

4. A method of claim 1, wherein the calling device is a mobile device, the method further comprising:
   receiving global position system (GPS) data from the calling device, wherein the GPS data is used to determine the location information of the calling device.

5. A method of claim 1, further comprising:
   initiating establishment of a communication session between one of the registered devices that receives the notification message and an operator of a public safety answering point.

6. A method of claim 1, wherein the notification message is an electronic mail message, an instant messaging (IM) message, a short message service (SMS) message, or a multimedia messaging service (MMS) message.

7. An apparatus comprising:
   a processor; and
   a memory including computer program code,
   the memory and the computer program code configured to, with the processor, cause the apparatus to perform at least the following,
   detect an emergency call from a calling device,
   determine an identifier of the calling device,
   retrieve a list of one or more registered devices based on the identifier,
   determine location information of the calling device,
   select a subset of the registered devices according to a proximity threshold determined based on an estimated response time, and
   generate a notification message for transmission to the one or more registered devices, wherein the notification message specifies notification of the emergency call and the location information of the calling device.

8. An apparatus of claim 7, wherein the apparatus is further caused, at least in part, to:
   determine whether any one of the registered devices are stationary devices; and
   retrieve a street address corresponding to the determined stationary devices for determining proximity to the calling device.

9. An apparatus of claim 7, wherein the registered devices include either a cellular phone, a computer, a set-top box, or a combination thereof.

10. An apparatus of claim 7, wherein the calling device is a mobile device, and the apparatus is further caused, at least in part, to:
    receive global position system (GPS) data from the calling device, wherein the GPS data is used to determine the location information of the calling device.

11. An apparatus of claim 7, wherein the apparatus is further caused, at least in part, to:
    initiate establishment of a communication session between one of the registered devices that receives the notification message and an operator of a public safety answering point.

12. An apparatus of claim 7, wherein the notification message is an electronic mail message, an instant messaging (IM) message, a short message service (SMS) message, or a multimedia messaging service (MMS) message.

13. A computer-readable storage medium carrying one or more sequences of one or more instructions, the one or more sequences of one or more instructions including instructions which, when executed by one or more processors, cause the one or more processors to perform:

detecting an emergency call from a calling device;

determining an identifier of the calling device;

retrieving a list of one or more registered devices based on the identifier;

determining location information of the calling device;

selecting a subset of the registered devices according to a proximity threshold determined based on an estimated response time; and     generating a notification message for transmission to the one or more registered devices, wherein the notification message specifies notification of the emergency call and the location information of the calling device.

14. A computer-readable storage medium according to claim 13, wherein the instructions further cause the one or more processors to perform:

determining whether any one of the registered devices are stationary devices; and     retrieving a street address corresponding to the determined stationary devices for determining proximity to the calling device.

15. A computer-readable storage medium according to 13, wherein the notification message is an electronic mail message, an instant messaging (IM) message, a short message service (SMS) message, or a multimedia messaging service (MMS) message, and the registered devices include either a cellular phone, a computer, a set-top box, or a combination thereof.

16. A computer-readable storage medium according to 13, wherein the calling device is a mobile device, the method further comprising:

receiving global position system (GPS) data from the calling device, wherein the GPS data is used to determine the location information of the calling device.

17. A computer-readable storage medium according to 13, wherein the instructions further cause the one or more processors to perform:

initiating establishment of a communication session between one of the registered devices that receives the notification message and an operator of a public safety answering point.

18. A method of claim 1, further comprising:

determining the estimated response time based on a region type associated with the location information of the calling device.

19. A method of claim 1, further comprising:

selecting, independent of the identifier, one or more other registered users to receive the notification message based on the proximity threshold.

20. A method of claim 19, further comprising:

iteratively increasing the proximity threshold until a predetermined number of the other registered users are selected.

* * * * *